(12) United States Patent
Deyoe et al.

(10) Patent No.: US 7,849,010 B2
(45) Date of Patent: Dec. 7, 2010

(54) SYSTEM AND METHOD FOR REAL TIME ACCOUNT AND ACCOUNT NUMBER GENERATION USING ORIGINATION APIS

(75) Inventors: David Deyoe, Oakland, CA (US); Tim Coltrell, Danville, CA (US); Matt Montes, Danville, CA (US); Greg Pacheco, Walnut Creek, CA (US); Daniel Kjellen, Walnut Creek, CA (US); Shelly Ropolo, Fruits Heights, UT (US)

(73) Assignee: Accountnow, Inc., San Ramon, CA (US)

( * ) Notice: Subject to any disclaimer, the term of this patent is extended or adjusted under 35 U.S.C. 154(b) by 0 days.

(21) Appl. No.: 12/187,284

(22) Filed: Aug. 6, 2008

(65) Prior Publication Data

US 2009/0043677 A1    Feb. 12, 2009

Related U.S. Application Data

(62) Division of application No. 11/837,410, filed on Aug. 10, 2007.

(51) Int. Cl.
*G06Q 40/00* (2006.01)
*G06Q 30/00* (2006.01)

(52) U.S. Cl. .............................. 705/42; 705/26; 705/35
(58) Field of Classification Search .................. 705/26, 705/35, 42
See application file for complete search history.

(56) References Cited

U.S. PATENT DOCUMENTS

| | | | |
|---|---|---|---|
| 6,980,969 B1 | 12/2005 | Tuchler et al. | |
| 7,024,373 B1* | 4/2006 | Reynolds et al. | 705/14.56 |
| 7,054,838 B2 | 5/2006 | Sutton et al. | |
| 7,181,418 B1* | 2/2007 | Zucker et al. | 705/26 |
| 7,249,054 B2* | 7/2007 | Keil | 705/21 |
| 2001/0023415 A1 | 9/2001 | Keil | |
| 2002/0052814 A1* | 5/2002 | Ketterer | 705/35 |
| 2002/0069158 A1* | 6/2002 | Larkin et al. | 705/38 |
| 2003/0028792 A1* | 2/2003 | Plow et al. | 713/193 |
| 2003/0040997 A1* | 2/2003 | Rousseau et al. | 705/35 |
| 2003/0041023 A1* | 2/2003 | Goldstein et al. | 705/39 |
| 2004/0078332 A1 | 4/2004 | Ferguson et al. | |
| 2004/0143527 A1* | 7/2004 | Benkert et al. | 705/35 |
| 2005/0071268 A1* | 3/2005 | Riddett, Jr. | 705/40 |
| 2005/0125336 A1* | 6/2005 | Rosenblatt et al. | 705/39 |

(Continued)

OTHER PUBLICATIONS

Orenstein, David, QuickStudy: Application Programming Interface (API), Jan. 10, 2000, retrieved Jan. 28, 2010 at http://www.computerworld.com/s/article/43487/Application_Programming_Interface.*

(Continued)

*Primary Examiner*—Matthew S Gart
*Assistant Examiner*—Scott A Zare
(74) *Attorney, Agent, or Firm*—Perkins Coie LLP (57) ABSTRACT

A system and method generate an account in real time in accordance with an application programming interface (API). The API contains parameter descriptions listing universal resource locator (URL) parameters associated with items. A format for implementing an http request to transmit data to in compliance with the defined format is disclosed. A transparent mode for transmitting a response to an http request transmitting data provides for the transmission of an extensible markup language (XML) formatted file communicating an outcome to the request.

20 Claims, 5 Drawing Sheets

U.S. PATENT DOCUMENTS

| | | | |
|---|---|---|---|
| 2005/0147225 A1* | 7/2005 | Mallick et al. | 379/114.2 |
| 2006/0229974 A1* | 10/2006 | Keithley et al. | 705/38 |
| 2006/0265335 A1 | 11/2006 | Hogan et al. | |
| 2007/0118449 A1* | 5/2007 | De La Motte | 705/35 |
| 2007/0175982 A1* | 8/2007 | Bonalle et al. | 235/380 |
| 2008/0301022 A1* | 12/2008 | Patel et al. | 705/35 |
| 2008/0301023 A1* | 12/2008 | Patel et al. | 705/35 |

OTHER PUBLICATIONS

More than 500 online retailers now offering PaidByCash. Business Wire. Jul. 30, 2007.*

Dernovsek, Darla. Prepaid cards bridge the gap. Credit Union Magazine. v73n2. pp. 44-48. Feb 2007.*

Kuykendell, Lavonne. Altered states: The new ways to pay. Credit Card Management. v13n3. pp. 34-40. Jun. 2000.*

Co-pending U.S. Appl. No. 11/837,410, filed Aug. 10, 2007.

Co-pending U.S. Appl. No. 12/582,421, filed Oct. 20, 2009.

Restriction Requirement mailed Jun. 27, 2006 in Co-pending U.S. Appl. No. 11/837,410, filed Aug. 10, 2007.

Non-Final Office Action Mailed Sep. 12, 2008 in Co-pending U.S. Appl. No. 11/837,410, filed Aug. 10, 2007.

Restriction Requirement mailed Feb. 10, 2009 in Co-pending U.S. Appl. No. 11/837,410, filed Aug. 10, 2007.

Restriction Requirement mailed May 12, 2009 in Co-pending U.S. Appl. No. 11/837,410, filed Aug. 10, 2007.

Final Office Action Mailed Jul. 22, 2009 in Co-pending U.S. Appl. No. 11/837,410, filed Aug. 10, 2007.

Restriction Requirement Mailed Sep. 22, 2009 in Co-pending U.S. Appl. No. 11/837,410, filed Aug. 10, 2007.

Non-Final Office Action Mailed Jan. 6, 2010 in Co-pending U.S. Appl. No. 11/837,410, filed Aug. 10, 2007.

Orenstein, David, QuickStudy: Application Programming Interface (API), Jan. 10, 2000, retrieved Jan. 28, 2010 at http://www.computerworld.com/s/article43487/Application_Programming_Interface.

"Debit Prepaid, Phone Card Business Provider", 2003-2005, pp. 1-12.

* cited by examiner

| Item | Required |
|---|---|
| First Name | Yes |
| Middle Name | No |
| Last Name | Yes |
| Email | Yes |
| Street Address | Yes |
| City | Yes |
| State | Yes |
| Zip | Yes |
| Birth Date | Yes |
| Social Security Number | Yes |
| Home Phone | Yes |
| Work Phone | No |
| Card Choice | No |
| Direct Deposit Available | Yes |
| Credit Builder Opt In | Yes |
| pCode | Yes |
| Sub Code | No |
| Affiliate | No |
| Media Channel | No |
| URL | Yes |
| Issuing Bank | Yes |
| Transparent Mode | No |

SYSTEM AND METHOD FOR REAL TIME ACCOUNT AND ACCOUNT NUMBER GENERATION USING ORIGINATION APIS

RELATED APPLICATIONS

This is a divisional of U.S. patent application Ser. No. 11/837,410 filed Aug. 10, 2007 entitled System And Method For Real Time Account And Account Number Generation Using Origination APIS, which is incorporated herein by reference in its entirety.

BACKGROUND

Generally, providers of financial solutions benefit from lead generation in developing business. This is because lead generation drives individuals to financial services providers. Wholesalers, retailers, and other commercial establishments have a steady stream of customers which may desire financial solutions. Further, many of these customers are part of the 70-80 million persons in the United States that do not have the benefit of a bank account or credit card. Often the commercial establishments are in a position to offer financial services because their customers are using websites or are physically located in stores. Sometimes offering these financial services will help the commercial establishment to sell additional products and services. For Example, a store may require a bank account, credit, debit, or prepaid card, to purchase a service, but a customer may not have a bank account, credit, debit, or prepaid card, even though he has available funds and a steady stream of income. Such a non-banked Applicant is not served. Absent a financial service that would immediately provide the individual with an account the business may be lost. What is needed is a system and method for communicating lead generation between the commercial establishments and the providers of financial solutions with real-time account creation capabilities.

The foregoing examples of the related art and limitations related therewith are intended to be illustrative and not exclusive. Other limitations of the related art will be come apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above described problems have been reduced or eliminated, while other embodiments are directed to other improvements.

A novel system creates an account for an individual in real time by receiving applicant data, associating the applicant with a bank account from a pool of accounts and then providing the account number to the individual. Advantageously, this allows for sales to take place where non-banked customers might otherwise be turned away. In the case that a commercial establishment requires a bank account, credit, debit, or prepaid card number for the completion of a transaction, a bank account, credit, debit, or prepaid card number can be immediately provided to the commercial establishment without requiring the customer's interaction.

BRIEF DESCRIPTION OF THE DRAWINGS

Embodiments of the inventions are illustrated in the figures. However, the embodiments and figures are illustrative rather than limiting; they provide examples of the inventions.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

A novel system and method create an account for an individual in real time. A customer submits a request to a financial services provider for an account. The request includes applicant data describing the customer containing parameters associated with items formatted in accordance with an application programming interface (API) for originating applicant data. The financial services provider receives the request and associates a bank account with the customer. Then the customer is provided an American Banking Association (ABA) routing transit number (RTN) as well as a deposit account number. In addition a debit payment card having the ability to charge payments is provided. In a non-limiting embodiment, a Visa or MasterCard debit card is used.

Figure 1:
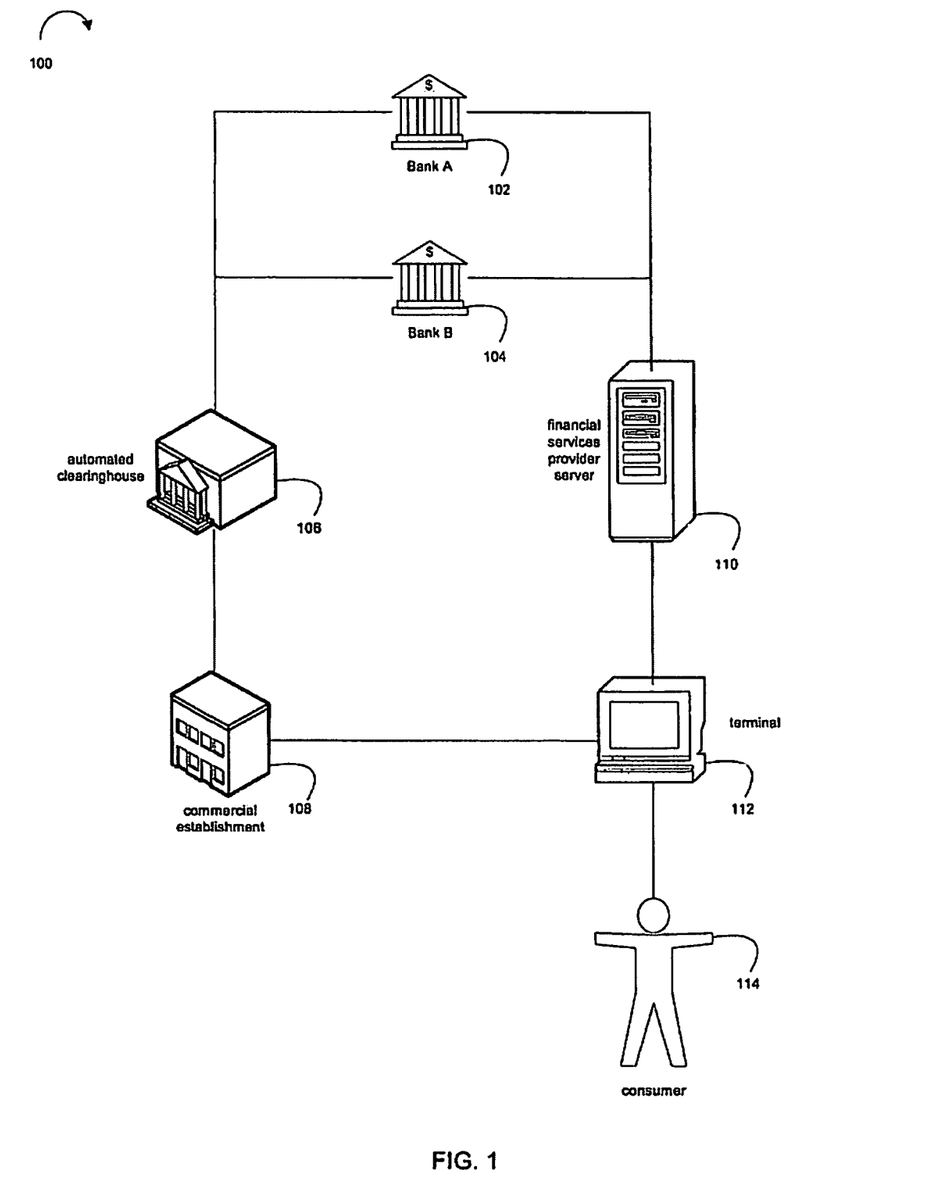
FIG. 1 depicts a diagram 100 of an example of a system for generating an account in real time.

FIG. 1 depicts a diagram 100 of an example of a system for generating an account in real time. Although this illustration depicts components as functionally separate, such depiction is merely for illustrative purposes. Those skilled in the art know that the components portrayed in this figure can be arbitrarily combined or divided into separate software, firmware, and/or hardware components. Furthermore, such components, regardless of how they are combined or divided can execute on the same computing device or multiple computing devices, and wherein the multiple computing devices can be connected by one or more networks.

In the example of FIG. 1, the system 100 includes bank A 102, bank B 104, automated clearinghouse 106, commercial establishment 108, financial services provider server 110, terminal 112, and customer 114. Here customer 114 can electronically connect with commercial establishment 108. Commercial establishment 108 requires a bank account, credit, debit, or prepaid card number for the electronic purchase of goods and services.

In a non-limiting example commercial establishment 108 is a company requiring a bank account, credit, debit, or prepaid card number for the sale of a cable TV service. Customer 114 would be turned away by commercial establishment 108 in the absence of an account to use. However, here, it is possible for customer 114 to be directed to financial services provider server 110 with the option of creating an account in real time for use in purchasing goods and services from commercial establishment 108.

Figure 2:
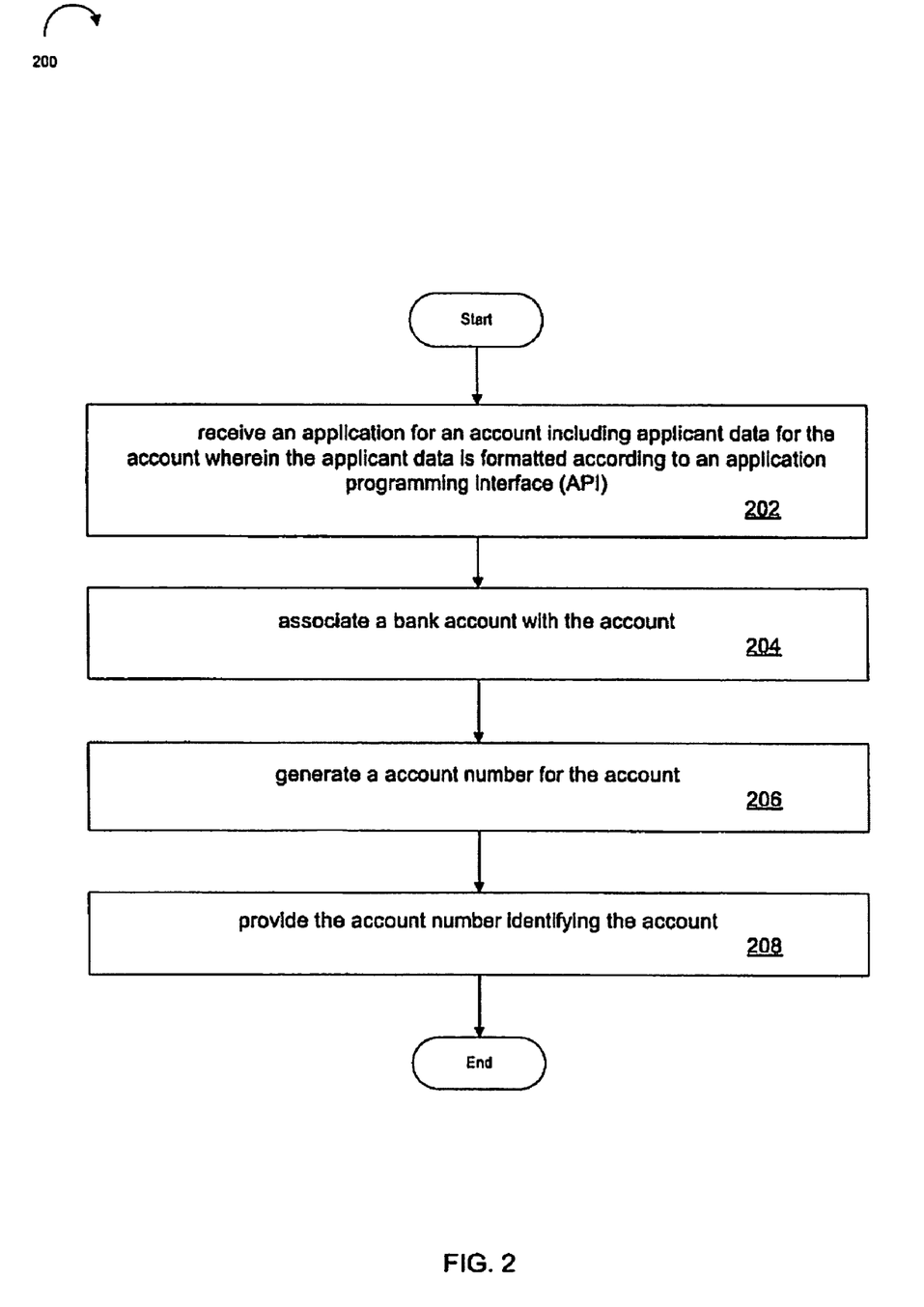
FIG. 2 depicts a flowchart 200 of an example of a method for generating an account in real time.

FIG. 2 depicts a flowchart 200 of an example of a method for generating an account in real time. Although this figure depicts functional steps in a particular order for purposes of illustration, the process is not limited to any particular order or arrangement of steps. One skilled in the art will appreciate that the various steps portrayed in this future could be omitted, rearranged, combined, and/or adapted in various ways.

Figure 4:
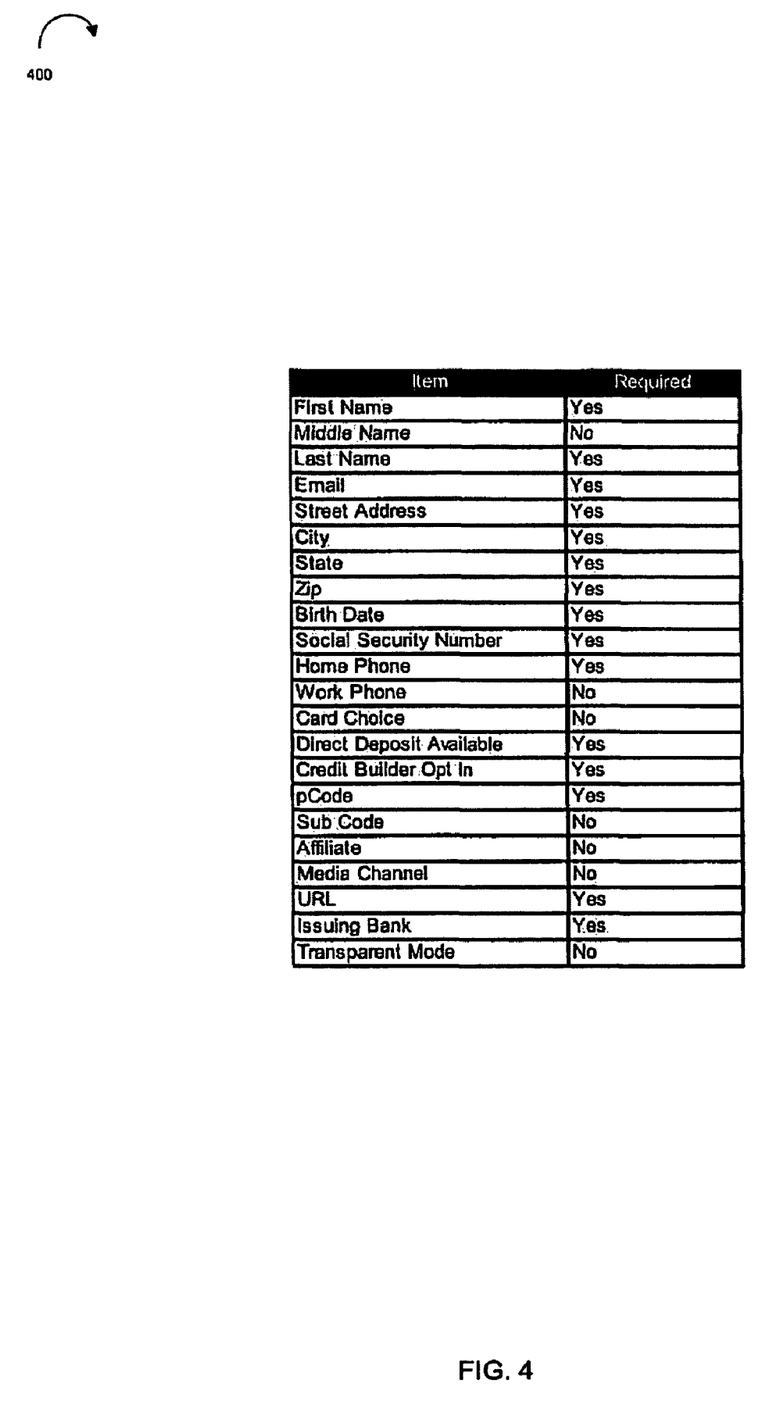
FIG. 4 depicts a table 400 of an example of parameters that can be used in creating an account in real time.

In the example of FIG. 2, the flowchart starts at module 202 with receiving a request for an application for an account including applicant data for the account wherein the applicant data is formatted according to an Origination API. An exemplary set of parameters for use in transmitting applicant data using a universal resource locator (URL) is given in FIG. 4. The parameters depicted in FIG. 4 are discussed in detail in reference to FIG. 4.

In the example of FIG. 2, the flowchart continues to module 204 with associating a bank account with the account. A plurality of banks is contemplated. It is possible to have a pool of accounts in which accounts at a bank A are reserved for a financial services provider. Similarly a pool of accounts at bank B is reserved as well. A financial services provider may then associate an account with an applicant from the accounts available to it from bank A, bank B . . . through bank n.

In some embodiments a screening process may be used to exclude any applicants that do not successfully meet initial criteria. An example of this process includes: transmitting an applicant's identification information to a credit reporting bureau for the purposes of identifying the applicant.

In a non-limiting example, the applicant data received is processed through the Office of Foreign Asset Control (OFAC) Specifically Designated Nationals (SDN) database for exclusion from consideration for an account. Further, any potential matches of customers will return a match code indicating which elements of the record matched, along with the full record from the database to assist in further verification. Additionally, after receiving an authentication outcome from the credit reporting bureau, the financial services provider may run an additional check against its internal application records using data from the credit reporting bureau.

In the example of FIG. 2, the flowchart continues to module 206 with generating an account number for the account. This can be done in real time using the Luhn algorithm, also known as the modulus 10 or mod 10 algorithm, which is a checksum formula used to validate a variety of identification numbers, such as account numbers. The algorithm can be used to distinguish valid numbers from collections of random digits.

In the example of FIG. 2, the flowchart continues to module 208 with providing the account number identifying the account.

In some embodiments a customer is using her own computing device. The computing device operates a web browser. The customer uses the web browser to visit a commercial establishment online to purchase products or services from their website. There the customer is confronted with a payment entry window presented by the commercial establishment. The customer may be simultaneously presented with a link offering to create an account so that the customer may complete her purchase.

In some embodiments, executing a link on a commercial establishment web page executes a program which transmits customer information to a financial services provider. The customer information is information that was already entered in furtherance of purchasing products or services obviating the need to re-enter it. Following the creation of the account, the account information may be automatically transmitted to the commercial establishment and the transaction completed.

In some embodiments, a link on a web page offered by a commercial establishment is provided concurrently with a request for payment. Following the link, the customer is provided with a data entry form for the collection of information in creating an account. Once the account information entered the information is transmitted to a financial services provider for the creation of an account. Once the account is created the account information may be either presented to the customer via a web page, or automatically communicated to the commercial establishment for purchase of the goods or services.

In some embodiments, a customer is located in a "brick and mortar" store owned by a commercial establishment using a computing device which runs a program operable to communicate with a financial services provider to request an account. The program is not a web browser, but is instead a program created at least in part for the purpose of gathering information and transmitting it to a financial services provider for creation of an account. A customer may enter the information and have an account generated. The newly generated account may be used to complete transactions with the commercial establishment while the customer is physically located at the "brick and mortar" store. The customer may receive products or services before leaving the store.

In some embodiments a customer is located in a "brick and mortar" store owned by a commercial establishment using a computing device having a web browser to apply for an account. The customer may visit a web site operated by the commercial establishment. The customer may be presented with a payment entry window containing a link offering to create an account. Following this link the commercial establishment provides information to a financial services provider for the purposes of creating an account for the customer. The customer information is information that was already entered in furtherance of purchasing products or services obviating the need to re-enter it for the financial services provider. Following the creation of the account, the account information may be automatically transmitted to the commercial establishment. The customer may then complete a transaction and is physically provided the goods or services before exiting the store.

In some embodiments a customer is located in a "brick and mortar" store owned by a commercial establishment using a computing device having a web browser to apply for an Account. A link on a commercial establishment web page is provided concurrently with a request for payment. Following the link, the customer is provided with a data entry form for the collection of information in creating an account. The customer enters account information. The account information is transmitted to a financial services provider for the creation of an account. Once the account is created the account information may be either presented to the customer via a web page. The customer may then provide the information to the commercial establishment for completion of a transaction. The customer may then be physically provided goods or services before exiting the store.

In some embodiments a customer is speaking with a customer service representative of a commercial establishment via tele-communication for the purpose of purchasing a product or service. In a non-limiting example, the customer calls a commercial establishment by telephone and offers to buy an item. A customer service representative requests payment information and offers to create an account that the customer can use to fulfill the payment information request. The customer responds requesting an account and provides account information for the creation of the account. The customer service representative for the commercial establishment receives account information from the customer and transmits it to a financial services provider. The financial services provider creates an account and transmits the information to the customer service representative. The customer service representative then completes a transaction using the newly created account and confirms with the customer that she has successfully purchased the requested product or service. The customer service representative may then provide the newly created account information to the customer.

In some embodiments transparent mode is observed. In transparent mode, a transparent mode parameter is set to "true." Then in stead of redirecting the applicant to a new page, the financial services provider server will send a file other than a web page communicating the response. The response could be a file formatted for the extensible markup language (XML) which could have the following structure:

```
<ApplicationResult>
    <Outcome>0</Outcome>
    <DepositOutcome>0</DepositOutcome>
    <TeleCheckReason>not authorized...</TeleCheckReason>
    <QCN>12345678901</QCN>
</ApplicationResult>
```

The tags identified above can be set to various values to indicate the results of the submission of applicant data. The following provide non-limiting examples of these results:

```
Values for <Outcome> could be:
    0    (Application has been accepted)
    1    (Error in submitted data, application has not been processed)
    2    (Problem processing the data, OK to try again later)
    3    (Application declined)
Values for <DepositOutcome> could be:
    0    (Deposit has been processed and approved)
    1    (Technical problem, connection error, deposit has not been
         processed)
    2    (Customer is not eligible for deposit)
    3    (TeleCheck Declined, refer to TeleCheckReason tag)
    4    (Other declined)
    9    (No CC or ACH was submitted for processing)
Values for <QCN> are:
    11-digit account number (if the application has been accepted)
    Empty string (if the application has not been accepted)
```

Figure 3:
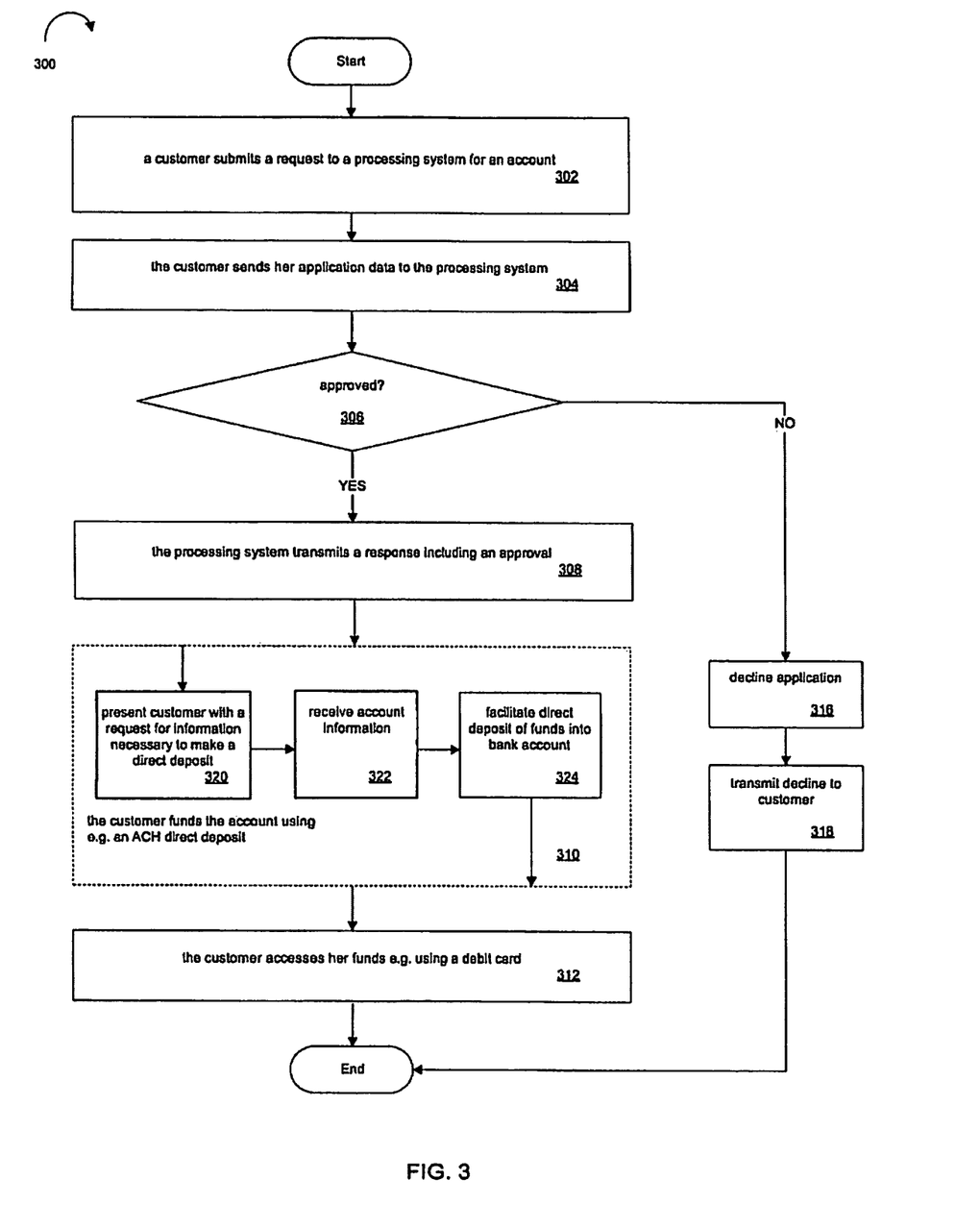
FIG. 3 depicts a flowchart 300 of an example of a method for generating an account in real time.

FIG. 3 depicts a flowchart 300 of an example of a method for generating an account in real time. Although this figure depicts functional steps in a particular order for purposes of illustration, the process is not limited to any particular order or arrangement of steps. One skilled in the art will appreciate that the various steps portrayed in this future could be omitted, rearranged, combined, and/or adapted in various ways.

In the example of FIG. 3, the flowchart starts at module 302 with a customer submitting a request to a processing system for an account. This could be done by the customer clicking on a link to a financial services provider's website to request a page where she can fill in applicant data.

In the example of FIG. 3, the flowchart continues to module 304 with the customer sending in application data to the processing system. Once the customer has filled in applicant data, she can submit it to the financial services provider. In a non-limiting example, this could be by submitting a web form.

In the example of FIG. 3, the flowchart continues to decision module 306 with determining whether or not the customer is approved. If the result from determination module 306 is NO, then the module proceeds to module 316 with declining the application. There the flowchart proceeds to module 318 with transmitting the decline to the customer. Then the flowchart terminates.

In the example of FIG. 3, if the result of decision module 306 is YES, then the flowchart proceeds to module 308 with transmitting a response including an approval. An approval can be transmitted via a web page, or as discussed above, in transparent mode. The customer may be provided with her account information.

In the example of FIG. 3, the flowchart proceeds to module 310 with the customer funding the account using e.g. an ACH direct deposit. A direct deposit could provide funds from another bank account to the customer's newly associated bank account.

In some embodiments module 310 contains 320, 322, and 324. In Module 320 the customer is presented with a request for information necessary to make a direct deposit. Such a request could be a web form containing fields directed to account information such as the percentage or amount of direct deposit to be made. From module 320, the flowchart proceeds to module 322 with receiving the customer's direct deposit information to be debited. From module 322 the flowchart proceeds to module 324 with facilitating direct deposit into customer's bank account associated with the financial services provider. In facilitating the direct deposit, the financial services provider instructs the customer's to deposit the amount or percentage of the customer's paycheck as specified by the customer in module 320.

In some embodiments, module 310 contains only module 324. Module 324 facilitates direct deposit of the customer's paycheck into the customer's bank account associated with the financial services provider. In facilitating the direct deposit, the financial service provider instructs the customer's employer to deposit an amount or percentage of the customer's paycheck as determined by the customer.

In the example of FIG. 3, the flowchart continues to module 312 with the customer accessing her funds e.g. by using a prepaid debit card. In this case, the customer is able to use the funds contained in the account to purchase goods and services. Advantageously, this allows the customer to purchase goods and services that the customer could not purchase without an account.

FIG. 4 depicts a table 400 of an example of parameters that can be used in creating an account in real time. The Origination API includes these parameters. "Required" indicated whether or not data must be present for the applicant data to be accepted.

As examples of parameters the following items are the applicant data as named: First Name, Middle Name, Last Name, Email, Street Address, City, State, Zip, Birth Date, Social Security Number, Home Phone, Work Phone.

As examples of parameters Card Choice may reflect a decision by the customer as to which card she wants e.g. a Silver MasterCard, a Black Mastercard, a Black Visa, or a Pink Visa. Direct Deposit Available may be set to "1" meaning direct deposit is available through an employer, "2" meaning direct deposit is available through a benefits provider, "10" meaning Direct Deposit is not available, "11" meaning customer is not employed, "12" meaning customer does not know if the direct deposit is available or not.

As examples of parameters, pCode is a fields which can be set for internal purposes having a format PxxxxCxxxxSxxxx. Sub Code is also a field which can be set for internal purposes.

Affiliate can be set to include a referring entity so that credit can be given for lead generation where an Affiliate drives business to the financial services provider. Media Channel can be used to identify a search engine or other channel e.g. Google search, Yahoo search. URL may be set to the full signup URL identifying the exact web location where the customer data was collected. Issuing Bank is used to identify one of the plurality of banks which provide the pool of accounts from which to associate a customer with. Transparent Mode may be set to true or false meaning that if true, then there is no redirection of the customer to another page, and instead an XML response is returned to the applicant. If false, then the applicant is redirected to another page where she collects her account information.

In some embodiments get request URL (universal resource locator) can be formatted to transmit an applicant's application information by formatting the URL in accordance with the "parameter=" format. Under this format, a parameter name is followed by the "=" sign which is then followed by a unit of data corresponding to a parameter.

Figure 5:
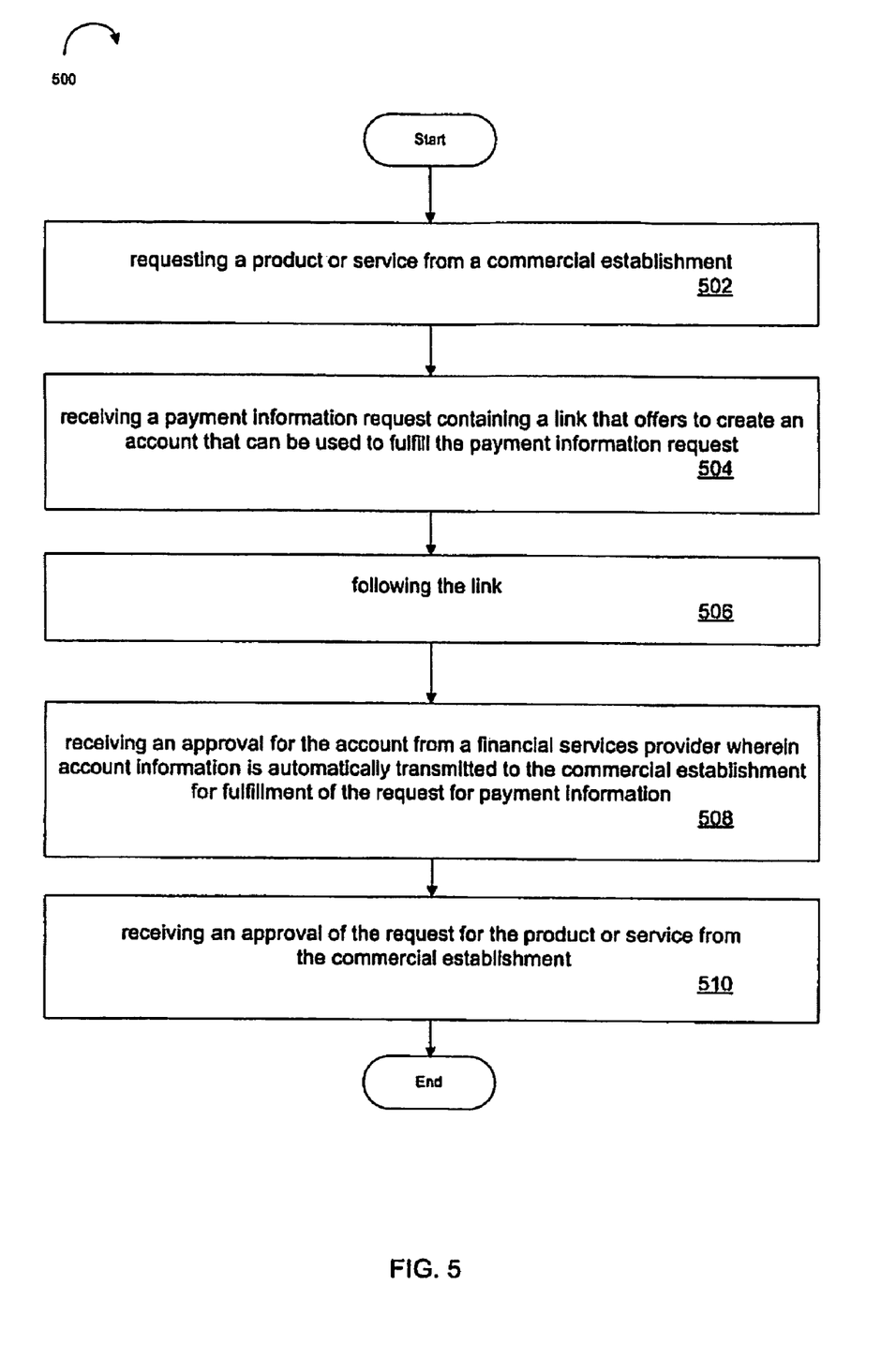
FIG. 5 depicts a flowchart 500 of an example of a method for generating an account in real time.

FIG. 5 depicts a flowchart 500 of an example of a method for generating an account in real time. Although this figure depicts functional steps in a particular order for purposes of illustration, the process is not limited to any particular order or arrangement of steps. One skilled in the art will appreciate that the various steps portrayed in this future could be omitted, rearranged, combined, and/or adapted in various ways.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations, and equivalents as fall within the true spirit and scope of the present invention.

We claim:

1. A method for creating a pre-paid debit account for a customer while the customer is purchasing services or goods from a commercial establishment, the method, comprising:
   entering customer information, by the customer, in furtherance of the purchasing services or goods from the commercial establishment through a web page of the commercial establishment;
   the customer requesting the creation of the pre-paid debit account via the web page of a commercial establishment while making a purchase of the services or goods from the commercial establishment, the purchase also being made via the web page of the commercial establishment,
   transmitting, to a financial services provider server, applicant data formatted according to an application programming interface (API),
   wherein, the applicant data describes the customer requesting creation of the pre-paid debit account;
   wherein, the applicant data transmitted to the financial services provider server to be used for fulfilling the customer request is limited only to the customer information that was already entered by the customer in furtherance of the purchasing the services or goods from the commercial establishment through the web page of the commercial establishment thus obviating a need for the customer to re-enter the customer information in furtherance of the purchase;
   receiving, at the financial services provider server, the applicant data of the customer;
   generating, by the financial services provider server, the pre-paid debit account;
   wherein the customer is able to use the pre-paid debit account that has been requested by the customer and generated by the financial services provider server to purchase the services or goods from the commercial establishment.

2. The method of claim 1, wherein, the generating the pre-paid debit account includes generating an account number for identification of the pre-paid debit account.

3. The method of claim 1 further comprising, providing the account number identifying the pre-paid debit account: wherein the account number is provided in transparent mode.

4. The method of claim 3 wherein transparent mode comprises providing a tag formatted in extensible markup language (XML), the tag including a value that specifies an outcome of a request for the creation of the pre-paid debit account.

5. The method of claim 2 further comprising transmitting the account number to the commercial establishment for the purchase of the goods or services.

6. The method of claim 1 wherein the financial services provider server selects a bank from multiple banks to use in creating the pre-paid debit account.

7. The method of claim 6 wherein the pre-paid debit account is associated with the bank identified by an issuing bank identification number.

8. The method of claim 1 wherein a social security number and a date of birth received in the application programming interface are used to validate identity of the customer.

9. A system for creating an account for a customer of a commercial establishment in real time, the system, comprising:
   a first computing device associated with the commercial establishment, the first computing device configured to:
   receive customer information, entered by the customer, via a web page of the commercial establishment, in furtherance of the purchasing services or goods from the commercial establishment;
   receive a request, from the customer, to create a pre-paid debit account via the web page of the commercial establishment while making a purchase of the services or goods from the commercial establishment, the purchase being made via the web page of the commercial establishment;
   transmit, to a financial services provide server, applicant data formatted according to an application programming interface (API),
   wherein the applicant data describes the customer requesting creation of the prepaid debit account;
   a second computing device associated with a financial services provider the second computing device configured to:
   receives an application from the first computing device for a prepaid debit account including applicant data for creation of the pre-paid debit account;
   wherein, the applicant data included within the application transmitted by the first computing device and received by the second computing device is limited only to customer information that was already entered by the customer in furtherance of the purchasing the services or goods from the commercial establishment through the web page of the commercial establishment thus obviating the need to re-enter the applicant data for the financial services provider server;
   generates the pre-paid debit account;

wherein the customer is able to use the pre-paid debit account generated by the financial services provider server to purchase the services or goods from the commercial establishment.

10. The system of claim 9 wherein, the generating the pre-paid debit account includes generating an account number for identification of the pre-paid debit account; wherein providing the account number is accomplished by a providing a web page including the account number.

11. The system of claim 9 wherein the account number is provided in transparent mode.

12. The system of claim 9 wherein the financial services provider selects a bank from multiple banks to use in creating the pre-paid debit account.

13. The system of claim 10 wherein the second computing device is further configured to transmits the account number to the first computing device associated with commercial establishment for a purchase of the goods or services.

14. A non-transitory computer readable storage medium including instructions that when executed cause a computing device to perform a method to create a pre-paid debit account for a customer, the method, comprising:
    entering customer information, by a customer, in furtherance of purchasing services or goods from the commercial establishment through the web page of the commercial establishment;
    the customer requesting the creation of the pre-paid debit account via a web page of a commercial establishment while making a purchase from the commercial establishment, the purchase also being made via the web page of the commercial establishment;
    transmitting, to a financial services provider server, applicant data formatted according to an application programming interface (API);
    wherein the applicant data describes the customer requesting creation of the pre-paid debit account;
    wherein, the applicant data transmitted to the financial services provider server to be used for fulfilling the customer request is limited only to customer information that was already entered by the customer in furtherance of the purchasing the services or goods from the commercial establishment through the web page of the commercial establishment thus obviating a need for the customer to re-enter the customer information in furtherance of the purchase;
    receiving, at the financial services provider server, the applicant data of the customer;
    the financial services provider server using the applicant data to create the pre-paid debit account;
    wherein, the customer is able to use the pre-paid debit account that has been requested by the customer and generated by the financial services provider server to purchase the services or goods from the commercial establishment.

15. The computer readable storage medium of claim 14, the method
    further comprising,
    generating an account number for the bank account;
    providing, to the customer, the account number identifying the bank account.

16. The computer readable storage medium of claim 15 wherein the account number is provided in transparent mode.

17. The computer readable storage medium of claim 14 wherein the pre-paid debit account is associated with a bank selected from a plurality of different banks and the bank is identified by an issuing bank identification number.

18. The computer readable storage medium of claim 14, the method further comprising transmitting the account number to the commercial establishment for the purchase of the goods or services.

19. The computer readable storage medium of claim 18, the method further comprising scrambling the account number before transmitting the account number.

20. The computer readable storage medium of claim 15 wherein the providing the account number is accomplished by transmitting the account number to the customer as a part of a web page.

* * * * *